(12) United States Patent
Alston

(10) Patent No.: US 8,051,950 B2
(45) Date of Patent: Nov. 8, 2011

(54) SYSTEM FOR REDUCING ACOUSTIC ENERGY

(75) Inventor: Gerald K. Alston, Oakland, CA (US)

(73) Assignee: Glacier Bay, Inc., Union City, CA (US)

( * ) Notice: Subject to any disclaimer, the term of this patent is extended or adjusted under 35 U.S.C. 154(b) by 641 days.

(21) Appl. No.: 11/498,159

(22) Filed: Aug. 3, 2006

(65) Prior Publication Data

US 2008/0029337 A1 Feb. 7, 2008

(51) Int. Cl.
*E04B 1/84* (2006.01)
*E04B 1/82* (2006.01)
*E04B 1/86* (2006.01)
*E04B 1/62* (2006.01)

(52) U.S. Cl. ........................................ 181/294; 181/290

(58) Field of Classification Search ................. 181/294, 181/290, 286, 288, 292
See application file for complete search history.

(56) References Cited

U.S. PATENT DOCUMENTS

| | | | | |
|---|---|---|---|---|
| RE14,992 | E * | 11/1920 | Sabine et al. | 181/294 |
| 1,900,522 | A * | 3/1933 | Sabine | 181/290 |
| 3,087,572 | A * | 4/1963 | Baruch et al. | 181/286 |
| 3,881,569 | A * | 5/1975 | Evans, Jr. | 181/200 |
| 3,985,198 | A * | 10/1976 | Kurtze et al. | 181/286 |
| 4,272,572 | A * | 6/1981 | Netherly | 428/35.5 |
| 4,989,688 | A * | 2/1991 | Nelson | 181/287 |
| 5,108,833 | A * | 4/1992 | Noguchi et al. | 428/310.5 |
| 5,225,622 | A * | 7/1993 | Gettle et al. | 86/50 |
| 5,304,415 | A * | 4/1994 | Kurihara et al. | 428/328 |
| 5,439,735 | A | 8/1995 | Jamison | |
| 5,484,970 | A * | 1/1996 | Suzuki et al. | 181/294 |
| 5,518,806 | A * | 5/1996 | Eder et al. | 428/218 |
| 5,744,763 | A * | 4/1998 | Iwasa et al. | 181/286 |
| 5,754,491 | A * | 5/1998 | Cushman | 181/284 |
| 5,777,947 | A * | 7/1998 | Ahuja | 367/1 |
| 5,851,626 | A * | 12/1998 | McCorry et al. | 428/95 |
| 5,916,681 | A * | 6/1999 | Cipin | 428/403 |
| 6,007,890 | A * | 12/1999 | DeBlander | 428/72 |
| 6,085,865 | A * | 7/2000 | Delverdier et al. | 181/292 |
| 6,123,171 | A * | 9/2000 | McNett et al. | 181/290 |
| 6,213,252 | B1 | 4/2001 | Ducharme | |
| 6,228,478 | B1 * | 5/2001 | Kliwer et al. | 428/317.7 |
| 6,256,959 | B1 * | 7/2001 | Palmersten | 52/588.1 |
| 6,586,072 | B1 | 7/2003 | Renault | |
| 6,672,426 | B2 * | 1/2004 | Kakimoto et al. | 181/290 |
| 6,776,258 | B1 * | 8/2004 | Grosskrueger et al. | 181/294 |
| 6,790,894 | B1 | 9/2004 | Albracht et al. | |
| 6,851,515 | B2 * | 2/2005 | Dussac et al. | 181/284 |

(Continued)

FOREIGN PATENT DOCUMENTS

DE 3924245 A1 * 2/1990

(Continued)

*Primary Examiner* — Edgardo San Martin
(74) *Attorney, Agent, or Firm* — Foley & Lardner LLP

(57) ABSTRACT

A sound insulator, including an assembly of connected particles, wherein the connected particles include particles adjacent to one another that are adhered to one another. The particles that are adhered to one another include particles of random shapes and random sizes and having respective diameters falling within a range from about a quarter of a millimeter to about four millimeters. The particles that are adhered to one another are adhered such that they form a sound suppression blanket.

30 Claims, 7 Drawing Sheets

U.S. PATENT DOCUMENTS

| | | |
|---|---|---|
| 6,920,723 B2 | 7/2005 | Downey |
| 7,037,865 B1 | 5/2006 | Kimberly |
| 7,520,369 B2 * | 4/2009 | Dravet et al. ............... 181/292 |
| 2004/0099476 A1 * | 5/2004 | Swift et al. .................. 181/286 |
| 2005/0126848 A1 * | 6/2005 | Siavoshai et al. ............ 181/290 |
| 2006/0037815 A1 * | 2/2006 | Schabel ....................... 181/290 |
| 2008/0135327 A1 * | 6/2008 | Matsumura et al. ......... 181/151 |

FOREIGN PATENT DOCUMENTS

EP 762382 A1 * 3/1997

* cited by examiner

SYSTEM FOR REDUCING ACOUSTIC ENERGY

BACKGROUND OF THE INVENTION

A variety of materials may be used to block sound, but no single material blocks noise, which is sound over a full range of high to low audible frequencies, without using relatively massive amounts of the single material.

What is commonly referred to as "noise" nearly always is the combination of many different frequencies. By way of example, the sound spectrum analysis presented in FIG. 1 depicts a 3-cylinder diesel engine running at 2,800 RPMs. The "noise" it emits includes frequencies ranging from 22 Hz to over 11 kHz. No single material can effectively block all these frequencies, at least without utilizing large amounts of that material, which may be impractical in many instances, such as onboard aircraft, seacraft, and/or automobiles, etc.

Moreover, materials that do block low audible frequencies, and, perhaps to a slightly lesser extent, medium audible frequencies (as opposed to the higher frequencies), tend to be very dense, and thus heavy. In comparison, foam, which has a resonant frequency that is comparatively quite high (above 250-500 Hz depending on thickness), allows lower frequencies to pass through virtually unaffected, only blocking higher frequencies. Attenuating these lower frequencies is difficult (more difficult than attenuating the higher frequencies). Lead and filled (also known as mineral loaded) vinyl of similar density, which relies on a higher mass to dampen the lower frequencies, may be used. Unfortunately, the material's comparatively heavy weight makes the use of lead and the like prohibitive in many applications (e.g., aircraft, seacraft, etc.) Moreover, these materials rely on the phenomenon of sound waves causing the material to vibrate when the waves impinge on the material. Due to the weight of the material, this vibration creates a new problem if the vibrating mass is allowed to mechanically transfer energy to another surface (such as a wall or bulkhead). In such an instance, the noise is simply transferred through and radiated off the other surface.

Conventional acoustic insulation materials used to address lower frequencies work well if they are of a high weight and thickness. There remains a need in the art for lighter and thinner damping layers that effectively attenuate noise in mid to low frequency ranges.

SUMMARY OF THE INVENTION

An embodiment of the present invention relates to a device composed of elastomeric particles for producing unique acoustic insulation to suppress specific frequency ranges of noise. In an exemplary embodiment, the elastomeric particles are connected and arranged such that adjacent particles resonate at different frequencies. The transfer of energy from a vibrating particle to an adjacent particle cancels out the vibrations, thereby dissipating acoustic energy. By having various sizes, shapes, weights, densities, and durometers of the elastomeric particles, different frequencies may be suppressed. The particle layer is granular and non-uniform in composition, as opposed to a uniformly molded sheet. In an embodiment, non-elastomeric particles may also be used.

An embodiment of the present invention includes elastomeric particles combined with layers of other materials, such as foam, to create a product capable of soundproofing/sound suppressing over a full range of audible frequencies from high to low sound waves. Unlike filled vinyl, lead, and other uniformly molded damping layers, embodiments of the present invention may attenuate mid and low frequency sound waves using a thinner and/or lighter material.

BRIEF DESCRIPTION OF THE DRAWINGS

FIG. 2b is an actual photographic view of the device of FIG. 2a.

FIG. 3a is a schematic of a magnified view of a portion of the material of FIG. 2a.

FIG. 3b is an actual photograph of the material of FIG. 2a.

FIG. 4b is an actual photograph of the material of FIG. 4a.

DETAILED DESCRIPTION OF THE PREFERRED EMBODIMENTS

Figure 1:
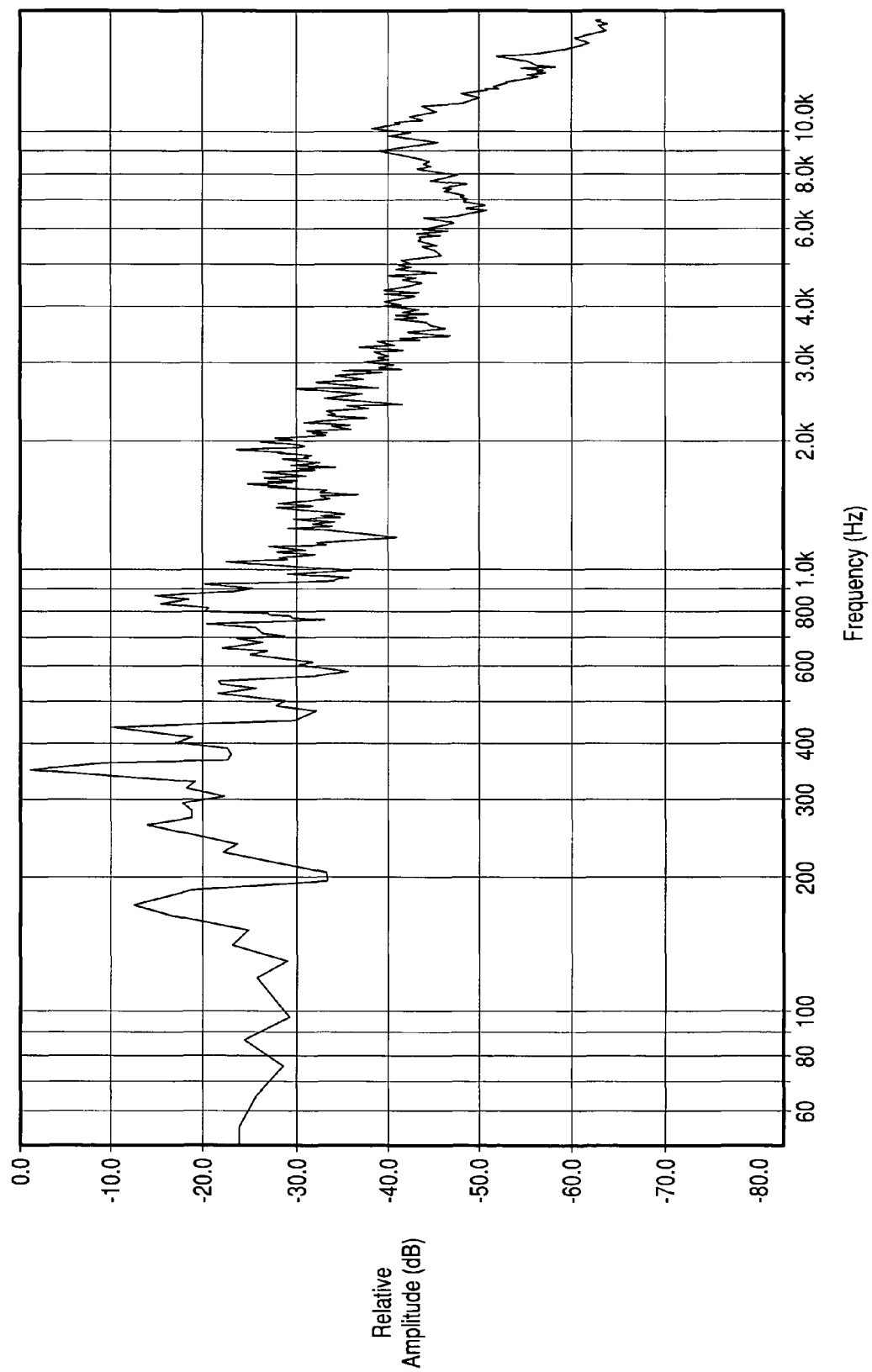
FIG. 1 is a graph of magnitudes of sound frequencies across the audible spectrum resulting from a diesel engine.
Figure 2A:
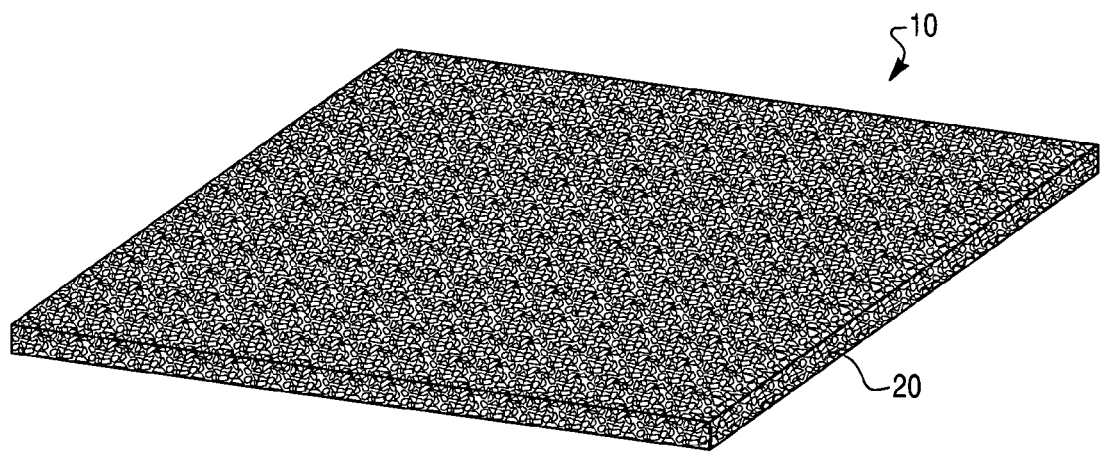
FIG. 2a is an isometric view of a device according to an embodiment of the present invention.
Figure 2B:
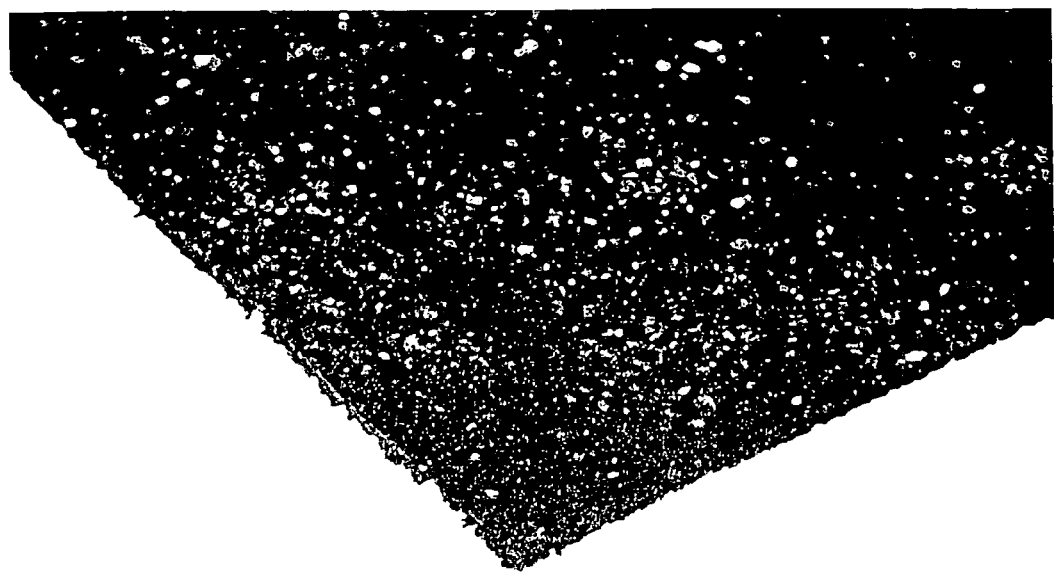

Specific embodiments of the present invention will first be described, followed by a more generalized discussion of other embodiments of the present invention and theories of operation of such embodiments. In this regard, FIG. 2a schematically depicts an isometric view of sound insulator 10 according to an embodiment of the present invention. The sound insulator 10, which may serve as a dampening layer, includes a sound suppression blanket 20 according to an embodiment of the present invention. The sound suppression blanket 20 comprises a plurality of particles 30 (see FIGS. 3a-3b, which depict a close-up view of the sound suppression blanket 20 of FIG. 2a) of varying sizes, shapes, weights, densities and durometers, (size range may be about a half a millimeter to about six millimeters; shapes may range from flat shapes, rectangular shapes, square shapes, round shapes, triangular shapes, trapezoidal shapes and/or irregular shapes; density range of the particles may be about a quarter of a gram per cubic centimeter to about twelve grams per cubic centimeter, and the density may fall within a range of 0.3-12.0 g/cubic centimeter) which may be loosely (that is, relatively loosely, while keeping the tensile strength between the particles high) and/or flexibly held together by heating, melting, or using an adhesive, which may be flexible, or any other method that may allow the present invention to be effectively practiced. In an embodiment of the present invention, the particles are elastomeric particles. In an embodiment, the particles may be wood, steel, plastic, etc. In an embodiment of the present invention, the particles are of any material that will allow the present invention to be practiced to effectively suppress sound at the desired frequencies. In an embodiment, the particles 30 are in close proximity to each other such that the sound suppression blanket 20 remains porous and a sufficient number of individual particles may reach their own resonant frequency. The connection is secure enough such that when two adjacent particles are vibrating, the connection enables the transfer of sufficient energy between the particles so as to dampen out each other's vibrations. In an embodiment, the individual particles are flexibly adhered to each other such that when a bending force is applied to the outer ends of two particles adhered at a single point, the radius of the bend at the adhered point shall be less than the average radius of the bend of each individual particle when measured from the point of adhesion to its outer edge.

In an embodiment, the number of particles in a unit volume of the sound suppression blanket formed by a centimeter in length, a centimeter in width and three millimeters of thickness, wherein the length, width and thickness of the volume are at right angles to one another, is between 4 and 5,000 particles.

The sound insulator 10 may be of any desired shape, length, or thickness that will allow the present invention to be effectively practiced. The layer may be formed using recycled rubber from, for example, tires, which may be shredded rubber (more on this below). In other embodiments, the particles may be specifically manufactured to practice the present invention.

Figure 3A:
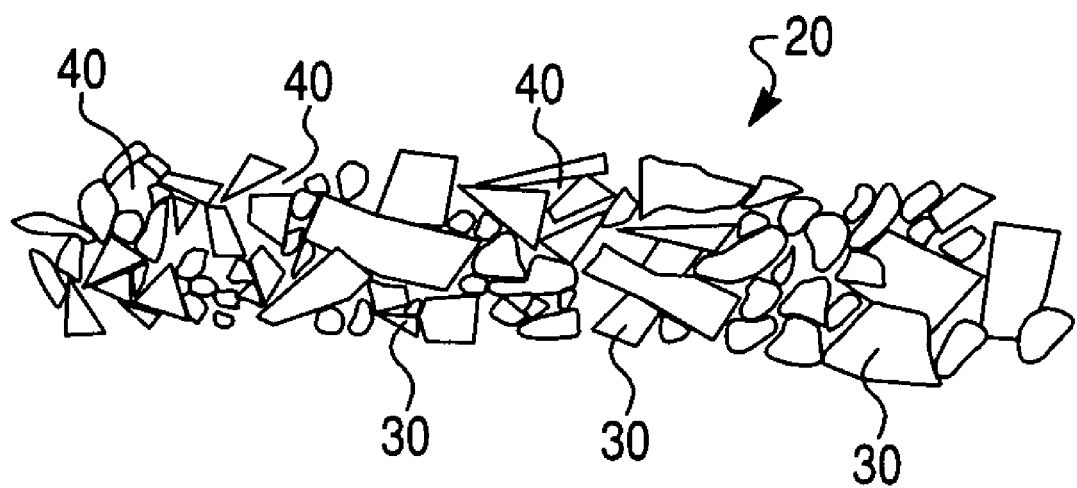
Figure 3B:
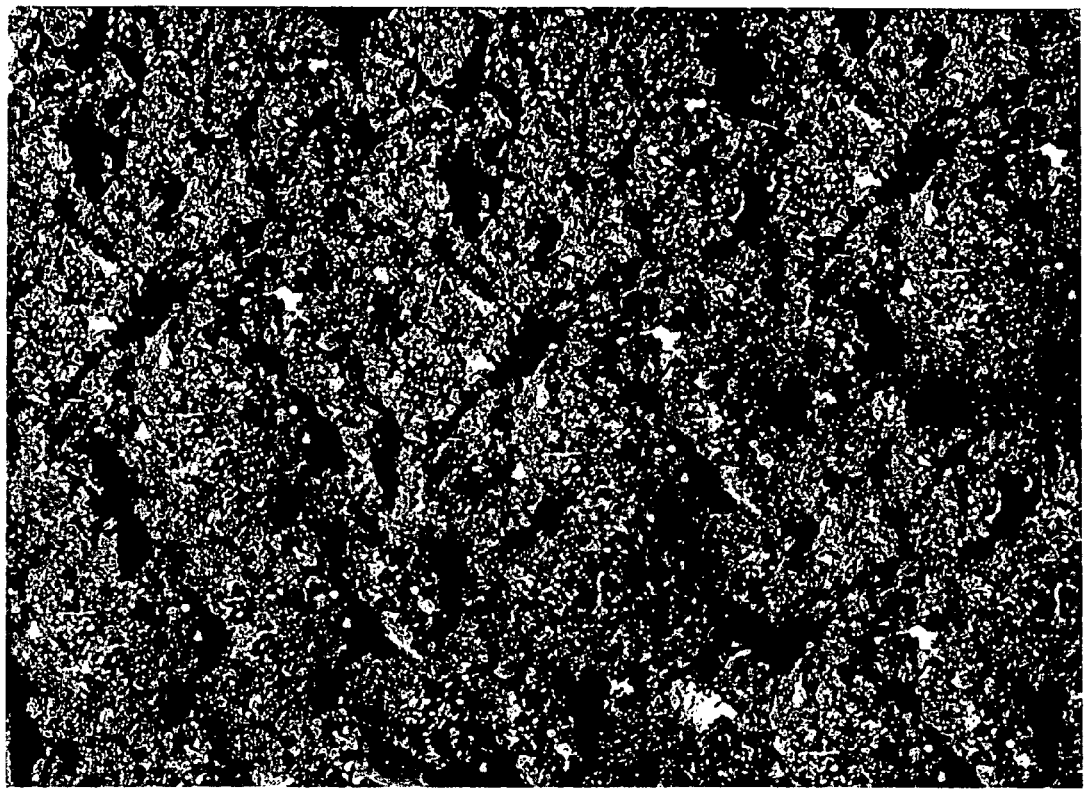

FIG. 3a depicts a magnified portion of the sound suppression blanket 20, with FIG. 3b depicting a photograph of an embodiment of the sound suppression blanket 20. The particles 30 are positioned in close proximity to each other and held together.

In an embodiment, the physical properties of the particles and the method of their interconnection may be selected to effectively tune the sound insulator to specific sound frequencies and therefore improve sound reduction. For example, the design of the sound suppression blanket 20 may be tuned to suppress specific frequencies by varying the material, size, shape, durometer, density, etc. of the particles 30 and/or varying the material and/or method used to achieve the adhesion between the particles, and/or by altering the physical properties of the adhesion. In an embodiment, the interstitial space 40 of the sound suppression blanket 20 (e.g., the space between the particles 30) remains free, which may allow (and/or enhance) the particles to vibrate at their resonant frequency. The connections between the particles are strong enough to allow transfer of energy from one vibrating particle to another to dissipate sound waves and reduce noise, but, in an embodiment, are not so strong that the resonant frequency of each individual particle is significantly altered. In an embodiment, the connections have a strength below or to about a strength that permits the particles to effectively resonate to practice the invention.

Figure 4A:
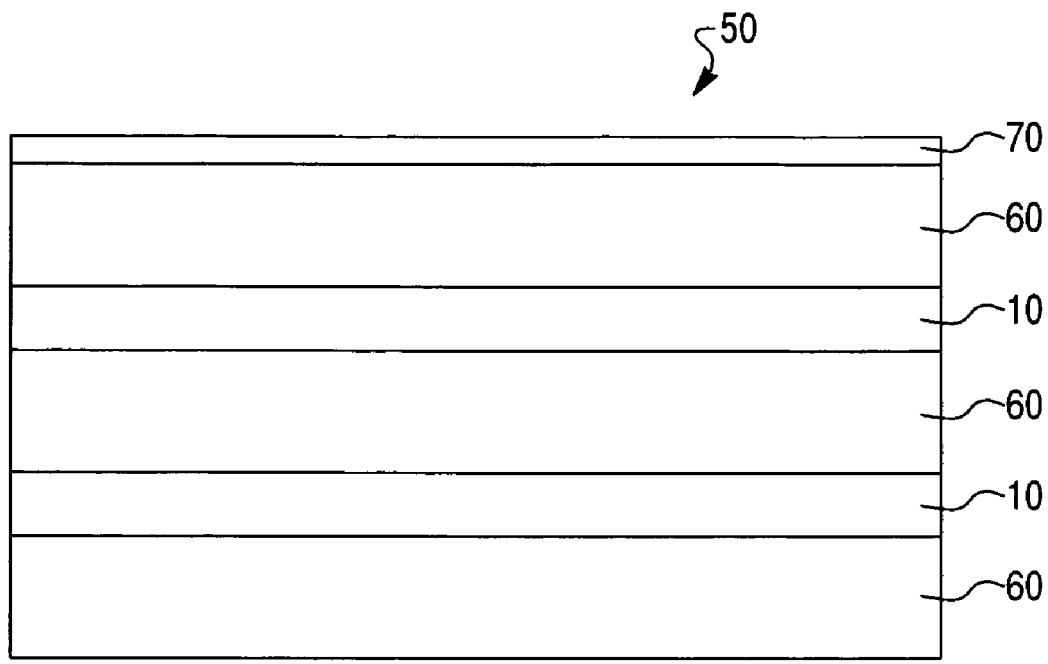
FIG. 4a is a schematic cross-sectional view of an embodiment of the present material comprising foam layers intermingled with sound suppression blankets according to an embodiment of the present invention.
Figure 4B:
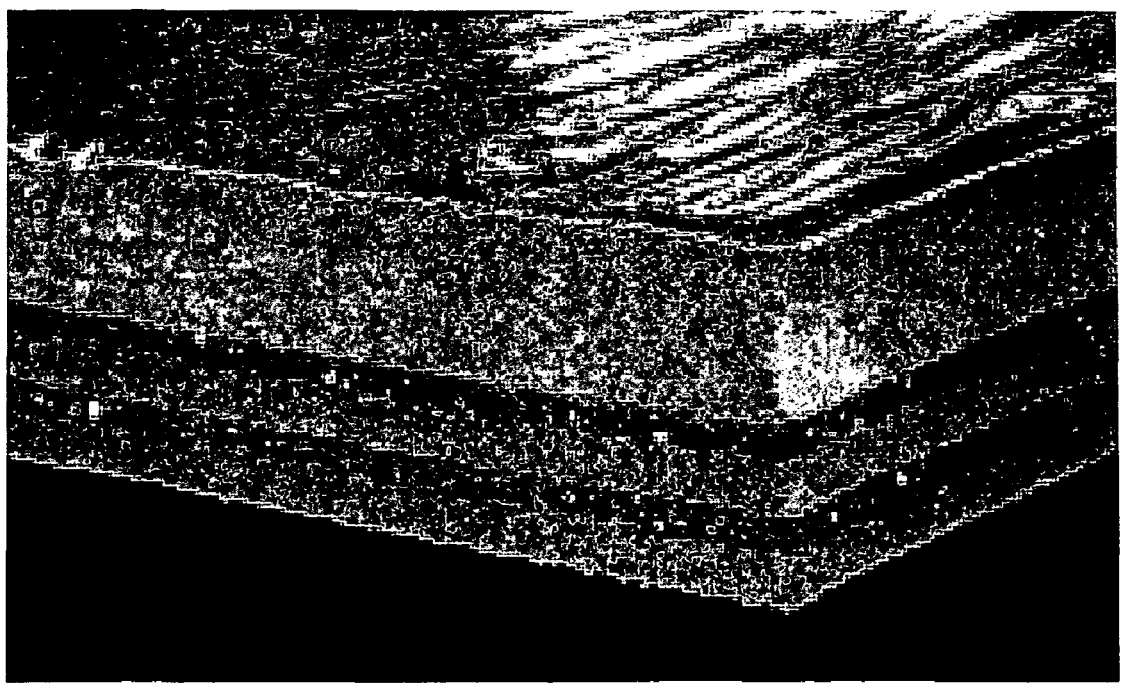

FIG. 4a depicts a sound shield 50 according to an embodiment of the present invention, while FIG. 4b is a photograph of an embodiment of a sound shield. In this embodiment, the sound shield 50 comprises three layers 60 composed of polyether or polyurethane foam or other material suitable to dampen and/or suppress higher frequency acoustical sounds, along with two layers of the sound insulator 10 according to an embodiment of the present invention. The layers alternate, as may be seen in FIGS. 4a-4b, with foam layers 60 being present on either side of the two sound insulators 10. In this embodiment, the foam layers 60 attenuate higher frequency acoustical noise and the sound insulators 10 attenuate mid and/or low frequency noise. Any number or combinations of foam layers 60 and/or sound insulators 10 may be used to form sound shields according to an embodiment of the present invention. Conversely, in other embodiments, the sound insulator(s) 10 may be used by themselves.

It will be noted that while in some embodiments, the higher frequency attenuation layers 60 may be composed of foam, other embodiments may utilize any other acoustical insulating material that may result in suppression of higher frequencies, especially, but not limited to, light weight materials. In some embodiments, the foam layer(s) is comprised of polyurethane or polyether, and is about 12 millimeters to about 25 millimeters thick. In some embodiments, the layers (foam and/or sound insulator) are of varying sizes.

As may be seen in FIGS. 4a-4b, the sound shield 50 also includes a shell 70 of planar configuration located on at least one face of one of the foam layers. In some embodiments, the shell 70 may be paper. In some embodiments, the shell enhances appearance and/or improves cleanability, and/or improves chemical resistance, and may provide a vapor barrier and/or reduce flammability. In some embodiments, it may be constructed of any material that imparts the desired enhancement properties and, in an embodiment, is suitably transparent to sound energy. In some embodiments, the shell 70 may be perforated metal, thin foils, fabric, paper, plastic films, woven and/or non-woven mineral fibers.

The various combinations of particles, especially but not limited to elastomeric particles, of various sizes, shapes, weights, densities and durometers and differences in the methods used to adhere the particles, the materials used to adhere the particles and the strengths of the adhesion, may change the acoustical properties of embodiments of the invention. These changes alone or combined with layers of other insulating material may be used to tune designs of sound insulators and sound shields to attenuate specific ranges of sound frequencies. Indeed, in an embodiment of the present invention, a first layer of the sound insulator 10 may be of a design such that it attenuates noise at a first range of frequencies, and may be combined with a second layer (with or without a layer of foam interposed between the first and second layers) of the sound insulator 10 that may be of a design such that it attenuates noise at a second range of frequencies, thus being complimentary to the first layer and providing a device that suppresses "more" noise.

A discussion of other embodiments of the present invention will now be provided, focusing on broader aspects of the embodiments and the understood theory of operation of an embodiment of the present invention.

As noted above, an embodiment of the present invention comprises sound suppression blankets made up of particles that are adhered to one another. The sound suppression blankets may be a granular, non-uniform layer of relatively loosely and/or flexibly suspended particles, provided that the individual particles have varying resonant frequencies and vibrate at different frequencies in response to incoming sound waves. In some embodiments, the sound suppression blankets are flexible, while in other embodiments, they are quasi-rigid or rigid. In some embodiments, the sound suppression blankets are formed as elongated plates, which may be flexible. An embodiment of the present invention may be practiced such that the particles are in close enough proximity to one another such that their differing vibrations, which are generated as a result of the incoming sound waves impinging upon the particles, cancel each other out, thereby dissipating acoustic energy. The connections between the particles, which in an embodiment are flexible, allow the particles to vibrate at their resonant frequency while transferring energy to other particles. In an embodiment, the interstitial space of adjacent particles remains free and is not filled in with other materials (atmospheric gas (air, nitrogen, etc.) of course may be in the interstitial space). In an embodiment, whatever occupies the interstitial space is matter that does not interfere with the ability of individual particles, upon vibrating as a result of impinging sound energy, to be set into motion independently of the surrounding particles which surround the particle. In an embodiment of the present invention, the matter which fills the interstitial space may be matter that (a) does not provide a structural adhesion to the adjacent particles and (b) is less efficient/not effective in transferring vibratory energy from one particle to another than/as the adhesion of the particles. By keeping the interstitial space free, lighter and thinner materials may be created (utilized), allowing those individual particles to vibrate in response to sound waves, as opposed to vibration of an entire layer, which is the case with lead or other solid substances/uniformly molded substances which require an additional absorption layer to cope with the vibration of the entire layer to avoid the vibration from being transferred to another structural component, through which the vibrations may be transferred, thus diminishing the usefulness of the lead substance/uniformly molded substances. Therefore, an embodiment of the sound suppression blanket according to the present invention remains porous. This enhances the ability of the individual particles to vibrate at their resonant frequencies. In this regard, the interstitial space is not completely filled with a resin and/or other material, such as the adhesive utilized to connect the various particles together. Indeed, the sound suppression blanket may include only the particles that are adhered to one another and an adhesive, if such an adhesive is present (as some embodiments may not utilize the adhesive, relying instead on welding the particles together), with no other material therein. In other embodiments of the present invention, other material may be present in the sound suppression blanket as long as the material does not interfere with the blanket's ability to suppress sound according to the present invention.

Changing the material, size, durometer and/or shape of the particles, etc., and/or changing the material used to adhere the particles to one another, the strength of the adhesion to one another, and/or the method of adhesion to one another may alter the physical properties of embodiments of the present invention, such that a user may tune designs of the present invention to the frequency range of expected sound waves to most efficiently attenuate sound by the material. The physical properties of the particles, which, as noted above, are, in some embodiments, elastomers, and/or the method of their interconnection, may be selected to effectively tune the insulation design to specific sound frequencies and improve sound reduction.

Embodiments of the present invention may be used to line housings for machines. For example, embodiments of the invention may be used to line the walls and enclosures of noise sources (such as operating machinery) to limit/prevent noise from passing through the wall or enclosure. Embodiments of the present invention may also be used to suppress echoes, reverberation, resonance and reflections within an enclosure or room, and in an embodiment, may be combined with other suitable devices/methods for soundproofing walls and other building materials. Embodiments of the invention may be used in any manner consistent with its acoustic insulation properties. In this regard, an embodiment of the present invention includes generator assemblies and other machine assemblies that comprise sound insulators and/or sound shields according to embodiments of the present invention. By way of example only and not by way of limitation, an embodiment of the present invention includes generator housings which are used to cover generators and the like, wherein the housing walls include sound insulators and/or sound shields as described herein. In other embodiments of the present invention, motors, such as diesel and/or gasoline powered motors, may be housed in housings having walls with sound insulators and/or sound shields according to the present invention. In yet other embodiments of the present invention, hydraulic motors, pumps, actuators, and/or any other machine which may produce noise, may be housed in the housing having walls that utilize the sound insulators and/or sound shields according to embodiments of the present invention. Indeed, in an embodiment, there are outboard motor housing covers that utilize the shields and/or insulators as described herein. In an embodiment of the present invention, there are housing assemblies that have walls with sound insulators and/or sound shields as described herein which are located in airplanes and/or boats. An embodiment of the present invention may be particularly useful in that the present invention provides for a light and/or low density sound suppression system, a feature that is particularly useful in industries such as the aircraft industry where keeping weight to a minimum is desirable. Other embodiments of the present invention may include automobiles that utilize sound insulators and/or sound shields as described herein to insulate a vehicle cabin from a noisy environment such as the noise generated by a motor, the vehicle, and/or such noise generated by passing vehicles, road noise, etc.

Embodiments of the present invention may be manufactured from recycled rubber or tires, shredded or chipped rubber, viscoelastic polymers, metals, plastics and/or other particles specifically manufactured for the purpose of this invention. In an embodiment of the present invention, particles are made of recycled rubber having a density of between about three quarters of a gram per cubic centimeter to about one and a half gram per cubic centimeter, while in other embodiments, the density is approximately 1.1 g/cubic centimeter. In an embodiment, the particles are hard-edged shapes (i.e., a shape whose edges are not significantly rounded). In an embodiment, particles with a hard-edged shape may be more easily induced to vibrate at low energy levels than may be a rounded shape. This may be useful at higher frequencies because these sounds wave may contain comparatively less energy than lower frequencies. In an embodiment, the particles may range in size from 0.4 millimeters to 3.2 millimeters. In an embodiment, the sizes range from a about four-tenths of a millimeter in diameter to about four millimeters in diameter. In an embodiment, the sizes range from about half a millimeter to about 3 millimeters. In an embodiment, the diameter ranges from about 0.05 mm to about 6.0 mm. In other embodiments, any size particles that may be connected to one another in order to suppress sound according to the present invention may be utilized.

In regard to embodiments that utilize shreddings from tires or other scrap rubber to form the particles, the tires/scrap rubber may be shredded utilizing a conventional tire shredding machine that is used for the disposition of scrap tires. These shredding machines, in an embodiment of the present invention, may produce the appropriate random sizes and shapes of the particles that will be adhered to one another to form the elongated flexible plate. In such embodiments, the tire shreddings may be adhered to each other utilizing a flexible adhesive, while in other embodiments, depending on the type of rubber utilized, the rubber may be heated so that adjacent particles of rubber are fused/welded with/to one another. In an embodiment of the present invention, different types and/or quality of rubber may be utilized to tune the designs of the flexible elongated plate. Thus, for example, the type of rubber utilized in one manufacturer's tires may be segregated from that from a different type of rubber utilized in another manufacturer's tires (or the same manufacturer's tires) so that different types of rubber may be utilized in respective different sound suppression blankets to suppress specific desired frequencies.

In an embodiment, the shapes of the particles may be circular, elliptical, trapezoidal, elongated, multifaceted, etc. Any shape that will allow embodiments of the present invention to be practiced may be utilized.

The particles are held together by heating, melting or using a flexible adhesive with the finished assembly having a density of approximately three quarters g/cc. The completed layer is about three millimeters to about six millimeters thick. In an exemplary embodiment of the invention, the particles, after formation (e.g., by a tire shredding machine, by a wood grinding machine, by molding, etc.) are disposed on a flat surface such that they are randomly dispersed with respect to size, shape, durometer, and/or material type, etc., and then are adhered to one another. After the adhesion process, which may be implemented through, for example, heating, melting, or using an adhesive, etc., the sound suppression blanket according to an embodiment of the present invention may be formed, which then is cut to the desired length and width, and cut to a desired thickness, although in other embodiments, the thickness may be determined by controlling the amount, size, shape, etc., of the particles when the particles are disposed on the flat surface. Indeed, in other embodiments, the length and/or width may also be controlled in a similar manner, alleviating and/or reducing the need for cutting/trimming. Also, other embodiments of the present invention may encompass disposing the particles on a non-flat surface, so as to obtain a curved blanket.

As detailed above, an exemplary embodiment of the invention entails providing foam combined with sound suppression blankets. In this regard, through the use of a combination of materials which work together to effectively control sound across a broad spectrum, superior noise reduction/suppression may be obtained. An embodiment of the present invention entails varying grouped material such that resonance characteristics of the material, as a result of the combination, are reduced and/or controlled. In an embodiment, one or two or more sound suppression blankets are combined with one, two, three or more layers of foam. In an embodiment, the sound suppression blankets serve as dampening layers, while foam effectively attenuates the high frequency sounds waves as detailed above. The various layers may be adhered to one another utilizing adhesive. The combination provides superior noise attenuation over an exceptionally broad range of frequencies and amplitude.

One embodiment entails a multilayer embodiment obtained by layering a sheet form of the attached particles with other complimentary materials, such as, for example, materials having characteristics which enhance the effectiveness of the invention and/or add additional qualities such that the completed multilayer embodiment possesses qualities that may not be present in an embodiment of the invention that is only a single material layer.

In an embodiment of the invention, the sound suppression blanket is adapted to dampen at least one of low and medium frequency acoustical vibrations. In an embodiment of the invention, the sound suppression blanket is adapted to dampen acoustical vibrations falling within at least a first range of about 200 Hz or less and a second range of about 200 Hz to about 2000 Hz. Other embodiments may dampen other frequencies beyond these ranges.

The structure of a multilayer embodiment may be determined by the performance characteristics desired. By way of example and not by way of limitation, in an embodiment for resisting the permeation of gases from all sides, gas resistant layers comprised of materials such as metal film or plastic may be placed so as to surround other layers (indeed, in some embodiments, all layers). Likewise, if the embodiment was desired and/or required only to be physically attractive from one side, only a single outer layer of fabric, colored foil or other suitable material may be used. The layers themselves may be held together by mechanical fastening or chemical or thermal bonding.

In one of the multilayer embodiments, a stack-up of the layers and the sound insulators is about four centimeters thick and the sound insulators are each about three millimeters thick, and the first and second foam layers are about six millimeters thick, wherein the third foam layer is substantially thicker than the first and second foam layers. In some layers, the stack-up is about 38 mm thick with two foam layers being each approximately 6 mm thick and a third layer being approximately 19 mm thick. In this same embodiment the blankets are approximately 3 mm thick. In some embodiments, there is a shell in the multilayer embodiment, the shell being of planar configuration including aluminized PET film, wherein the rigid shell is positioned on a face of one of the first and third layers away from the sound shields. In some embodiments, the shell is positioned on the foam layer that is substantially thicker than the other layers.

In other embodiments of the present invention, the sound suppression blanket may be utilized alone.

Given the disclosure of the present invention, one versed in the art would appreciate that there are other embodiments and modifications within the scope and spirit of the present invention. Accordingly, all modifications attainable by one versed in the art from the present disclosure within the scope and spirit of the present invention are to be included as further embodiments of the present invention.

What is claimed is:

1. A sound shield, comprising:
   (i) a first layer of foam;
   (ii) two sound insulators, wherein each sound insulator comprises:
      a sound suppression blanket including an assembly of connected particles;
      wherein the connected particles include particles adjacent to one another that are adhered to one another, the particles that are adhered to one another including particles of random shapes and random sizes;
      wherein interstitial space of the particles that are adhered to one another is not filled with other materials;
      wherein at least some of the adjacent particles that are adhered to one another are connected and arranged such that adjacent particles have different resonant frequencies and vibrate at their respective resonant frequencies independently from one another in response to sound waves;
   (iii) a second layer of foam interposed between the two sound insulators; and
   (iv) a third layer of foam,
   wherein the two sound insulators are interposed between the first layer of foam and the third layer of foam.

2. The sound shield of claim 1, wherein the sound suppression blanket is of dimensions such that width and length are each at least 10 times greater than its thickness.

3. The sound shield of claim 1, wherein interstitial space between the particles that are adhered to one another is substantially filled with air.

4. The sound shield of claim 1, wherein the sound suppression blanket is porous.

5. The sound shield of claim 1, wherein the sound suppression blanket has a mass density of about three-quarters of a gram per cubic centimeter.

6. The sound shield of claim 1, wherein the particles that are adhered to one another have random shapes which include elongated shapes, spherical shapes, elliptical shapes, trapezoidal shapes, and hard-edged shapes.

7. The sound shield of claim 2, wherein the sound suppression blanket has a thickness falling within a range of about 3 millimeters to about 6 millimeters.

8. The sound shield of claim 1, wherein at least some of the particles that are adhered to one another are configured to transfer vibratory energy, resulting from the exposure of the particles to sound waves, to an adjacent particle in order to cancel out vibratory energy of the adjacent particle and thereby dissipate the acoustic energy of the sound waves.

9. The sound shield of claim 1, wherein the individual particles that are adhered to one another have a mass density of about one gram per cubic centimeter.

10. The sound shield of claim 1, wherein the individual particles that are adhered to one another comprise automobile tire shreds.

11. The sound shield of claim 1, wherein the individual particles that are adhered to one another are flexibly adhered to one another.

12. The sound shield of claim 1, wherein the sound insulator is adapted to dampen at least one of low and medium frequency acoustical vibrations.

13. The sound shield of claim 1, wherein the layers of foam are adapted to dampen acoustical vibrations above about 2000 Hz, and wherein the sound insulators are adapted to dampen at least one of acoustical vibrations falling within a first range of frequencies below about 200 Hz and a second range of frequencies between about 200 to 2000 Hz.

14. The sound shield of claim 1, wherein a stack-up of the layers and the sound insulators is about four centimeters thick and the sound insulators are each about three millimeters thick, and the first and second foam layers are about six millimeters thick, and wherein the third foam layer is substantially thicker than the first and second foam layers.

15. The sound shield of claim 1, further comprising a shell of planar configuration including aluminized PET film, wherein the rigid shell is positioned on a face of one of the first and third layers away from the sound insulators.

16. The sound shield of claim 1, wherein the sound shield is of a design such that a 1 meter by 1 meter section of the sound shield, 38 millimeters thick, reduces noise emitted by a three cylinder diesel engine proximate the sound shield by more than about 10 decibels.

17. A generator assembly, comprising:
a generator; and
a generator housing,
wherein the generator housing includes a sound shield according to claim 1.

18. The sound shield of claim 1, wherein the particles are configured so that energy is transferred from a vibrating particle to an adjacent particle so that the sound suppression blanket cancels out the vibrations to dissipate acoustic energy.

19. The sound shield of claim 1, wherein the sound suppression blanket is porous, the porosity of the sound suppression blanket falling within a range of about 10% to about 80%.

20. The sound shield of claim 1, wherein the particles that are adhered to one another have shapes that are relatively easily induced to vibrate at low energy levels.

21. The sound shield of claim 1, wherein the individual particles that are adhered to one another are adhered flexibly to one another at a single point such that when a bending force is applied to outer ends of two particles adhered at a single point, a radius of the bend at the single point is less than an average radius of the bend of each individual particle when measured from a point of adhesion to its outer edge.

22. The sound shield of claim 1, wherein the particles that are adhered to one another consist essentially of particles having respective diameters falling within a range from about a four-tenths of a millimeter to about four millimeters.

23. The sound shield of claim 1, wherein the sound insulator is adapted to dampen at least one of acoustical vibrations falling within a first range of frequencies below about 200 Hz and a range of frequencies between about 200 to 2000 Hz.

24. A sound shield, comprising:
(i) a first layer of foam;
(ii) two sound insulators, wherein each sound insulator comprises:
a sound suppression blanket including an assembly of connected particles;
wherein the connected particles include particles adjacent to one another that are adhered to one another, the particles that are adhered to one another including particles of random shapes and random sizes and having respective diameters falling within a range from about a four-tenths of a millimeter to about four millimeters, wherein interstitial space of the particles that are adhered to one another is not filled with other materials;
wherein at least some of the particles that are adhered to one another are connected and arranged such that adjacent particles have different resonant frequencies and vibrate at their respective resonant frequencies independently from one another in response to sound waves;
(iii) a second layer of foam interposed between the two sound insulators; and
(iv) a third layer of foam,
wherein the two sound insulators are interposed between the first layer of foam and the third layer of foam.

25. The sound shield of claim 24, wherein the sound suppression blanket is porous.

26. The sound shield of claim 24, wherein the sound suppression blanket consists essentially of the particles that are adhered together and a binder adhering the particles together.

27. A sound shield, comprising:
a first sound insulator, wherein the first sound insulator includes a first assembly of first connected particles, wherein the first connected particles include first particles adjacent to one another that are adhered to one another, the first particles that are adhered to one another including particles of random shapes and random sizes, wherein some of the first particles that are adhered to one another are connected and arranged such that adjacent particles have different resonant frequencies and vibrate at their respective resonant frequencies independently from one another in response to sound waves, wherein the first sound insulator is adapted to dampen acoustical vibrations falling within a first range of frequencies;
a second sound insulator, wherein the second sound insulator includes a second assembly of second connected particles, wherein the second connected particles include second particles adjacent to one another that are adhered to one another, the second particles that are adhered to one another including particles of random shapes and random sizes, wherein some of the second particles that are adhered to one another are connected and arranged such that adjacent particles have different resonant frequencies and vibrate at their respective resonant frequencies independently from one another in response to sound waves, wherein the second sound insulator is adapted to dampen acoustical vibrations falling within a second range of frequencies;
wherein the first and second sound insulators are proximate one another; and a foam layer interposed between the first and second sound insulators, wherein the foam layer is adapted to dampen acoustical vibrations falling within a third range of frequencies different from and higher than either of the first and second range of frequencies.

28. The sound shield of claim 27, wherein the first range of frequencies is below about 200 Hz and a second range of frequencies is between about 200 to 2000 Hz.

29. The sound shield of claim 27, wherein the first sound insulator is substantially tangentially parallel to the second sound insulator.

30. The sound shield of claim 27, wherein the first range of frequencies does not overlap the second range of frequencies.

* * * * *